United States Patent Office 3,032,393
Patented May 1, 1962

3,032,393
METHOD FOR THE PREPARATION OF A TITANIUM SOLUTION
Rose Marie Cammack, Hayward, Wis., and Fredric V. Schossberger, Hinsdale, and Frank A. Ticulka, Chicago, Ill., assignors to Armour Research Foundation of Illinois Institute of Technology, Chicago, Ill., a not-for-profit corporation of Illinois
No Drawing.   Filed July 1, 1960, Ser. No. 40,192
4 Claims.   (Cl. 23—87)

The instant invention relates to a method of preparing concentrated solutions of titanium, and more specifically relates to the preparation of such solutions which are extremely useful in the subsequent processing to titanium dioxide pigments.

The present application is a continuation-in-part of our copending application of the same title, Serial No. 729,055, filed April 17, 1958, now abandoned.

To the best of our knowledge, the art most closely related to the present invention is found in British Patent No. 652,268, dated April 18, 1951, and assigned to the Nationalized Czechoslovakian Corporation, Spolek Pro Chemickou A Hutni Vyrobu Narodni Podnik. In such patent is disclosed a method of making titanium dioxide pigments from potassium and ammonium chlorotitanates wherein such materials are dissolved in dilute aqueous solution which is then hydrolyzed to yield the pigment.

For the present invention, and the benefits thereof, to be clearly understood and placed in proper perspective, it is necessary to consider the referenced British patent in somewhat greater detail. Using ammonium chlorotitanate as an example, such patent discloses the treatment of a sulfuric acid-titanium solution with solid ammonium chloride followed by saturation with gaseous hydrogen chloride whereby $(NH_4)_2TiCl_6$ is caused to precipitate. This chlorotitanate complex salt is then dissolved to form a dilute aqueous solution, following which such solution is hydrolyzed at elevated temperature to yield titanic acid and ammonium chloride in solution.

In another British patent, No. 651,729, dated April 11, 1951, and also assigned to the aforenamed Czechoslovakian company, is disclosed a method whereby ammonium or potassium chlorotitanate is used for the preparation of rutile seeding solutions to be added to sulfuric acid solutions of ilmenite ore prior to the hydrolysis of the latter to titanic acid. Such seeding solutions are prepared, for example, by dissolving potassium chlorotitanate in water up to a concentration of 0.5 mole per liter $K_2TiCl_6$. Following such preparation, the seed solution is usually neutralized with ammonium hydroxide and heated to 80° C. for 30 minutes to cause the precipitation of titanic acid of the rutile form.

In both instances—the precipitation of titanic acid and the precipitation of seeds—such precipitation occurs in the presence of considerable amounts of either potassium or ammonium ions, depending on the chlorotitanate starting material. It is known, however, that the presence of large amounts of such alkali ions during the precipitation of titanic acid, or the preparation of rutile seeds, impairs the quality of the pigments obtained therefrom. Upon washing titanic acid precipitated from the potassium chlorotitanate solutions of the prior art, adsorbed residual potassium ions are carried over into the calcination process for manufacturing rutile pigment. This causes sintering, off-color effects and reduction of brightness and tinting strengths of the final product. In addition to the foregoing detrimental effects in the preparation of rutile seed solutions, the presence of large amounts of potassium ions causes a decrease in the activity of the seeds.

It is also evident from the referenced British patents that the ammonium and potassium chlorides formed in solution when their respective chlorotitanate salts are hydrolyzed are only recoverable by the expensive, tedious process of concentrating the waste liquor in order that such chlorides are crystallized. To those skilled in the pigment arts this represents a considerable economic loss since in most instances it is less expensive to discard the dilute chloride solution than to crystallize such chlorides therefrom by the teachings of the prior art.

It is to the separation of ammonium, potassium and rubidium chlorides and to their ready recovery in the form of solids from chlorotitanate solutions thereof that our invention is primarily directed. We have found a means whereby the ammonium chloride and such two alkali metal chlorides may be readily separated from the chlorotitanate solution as crystalline solids. The result of our process, as will be evident from the description detailed below, is to provide an acidic solution containing primarily tetravalent titanium ions, chloride ions and a comparatively small quantity of ammonium, potassium or rubidium chlorides, such solution being capable of undergoing hydrolysis for conversion to titanium dioxide pigment.

In view of the foregoing, a primary object of our invention is to provide a process whereby ammonium, potassium and rubidium chloride may be readily removed in the form of solids from a chlorotitanate solution thereof.

Another object of our invention is to provide an acidic solution containing primarily titanium ion and chloride ion which may readily be converted into titanium dioxide pigment.

A further object of our invention is to provide a hydrochloric acid solution of titanium which may readily be used for the preparation of rutile seeding solutions.

Other objects, features and advantages of our invention will become apparent to those skilled in this particular art from the following detailed disclosure thereof.

In our invention the alkali metal chlorotitanate, e.g., $K_2TiCl_6$, is precipitated as taught by the art. However, after such precipitation we make use of decomposition and solubility phenomena within certain molar concentration which permits us to recover the alkali metal chloride component from the chlorotitanate. In order to fully explain our invention, we shall attempt to theorize the chain of events, it of course being understood that the actual working of our invention is not dependent upon such theory.

For purposes of example, the instant process utilizing potassium chlorotitanate should first be considered. As indicated above, in the prior art dilute aqueous solutions of such salt have been hydrolyzed to titanium dioxide pigments. We have found that at concentrations up to 0.8 mole per liter, $K_2TiCl_6$ is soluble in water, and up to such amount goes into a clear solution. However as the concentration is increased to above this value, KCl rapidly precipitates. The maximum concentration of such potassium chlorotitanate permissible by our process is 4.0 moles per liter. Concentrated solutions are obtained by heating the liquid solvent to slightly below 60° C. As the chlorotitanate goes into solution, in the molar range per liter of from 0.8 to 4.0, it immediately decomposes and solid potassium chloride formed according to the following:

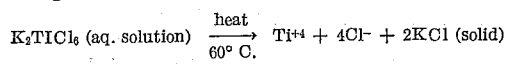
$$K_2TiCl_6 \text{ (aq. solution)} \xrightarrow[60° C.]{heat} Ti^{+4} + 4Cl^- + 2KCl \text{ (solid)}$$

Following such dissolution at elevated temperature, the solution is cooled to temperatures between 0° to 20° C. to decrease the solubility of KCl in the supernatant liquid. Subsequent analysis of the filtered liquid proved that up to 93% of the KCl available in $K_2TiCl_6$ was salted out and removed in the form of a solid.

According to our experiments 4.0 moles of alkali metal chlorotitanate is the maximum concentration that can be obtained by heating the solvent to 60° C., for this is the solubility limit of such salts at such temperature. Care should be taken not to heat to above this point, since hydrolysis may commence only a few degrees thereabove. At molar concentrations greater than 4.0, the solution becomes saturated with the chlorotitanate and excess salt fails to go into solution.

Not only is KCl precipitated, but in combination with the dissolution of chloride ions hydrochloric acid is likewise formed. Such formation is important to consider because at HCl concentration beyond the limit of its solubility in water (approximately 40% by weight or 11.4 molar) the acid is emitted as hydrogen chloride gas and can be recycled into the process.

The maximum amount of alkali metal chloride which can be recovered by our process is 93%, i.e, $$\frac{KCl \text{ (precipitated)}}{KCl \text{ (in } K_2TiCl_6)} = .93$$

Such optimum recovery may be obtained by the use of the following example:

Example I

An ilmenite solution, in sulfuric acid, is first cooled to reduce its iron content, and after the precipitation of iron sulfate by such cooling, a liter of such solution is analyzed as follows:

| | Gms. |
|---|---|
| Titanium | 98 |
| $H_2SO_4$ | 340 |
| Iron | 25 |

The solution is then saturated with HCl gas while maintained at 0° C., and a stoichiometric amount of KCl (in this case 304.8 gms.) added in order to precipitate $K_2TiCl_6$. Following this, 696 grams of such precipitate are dissolved in water with the aid of heating to about 60° C., after which the solution is cooled to about 0° C. Solid KCl, weighing 284 grams, precipitates and is removed by filtration. This is 93% of the KCl originally added to precipitate the chlorotitanate. The supernatant solution is found to contain 180 grams of titanium per liter.

Example II

In a process similar to that of Example I, the starting ilmenite solution is analyzed as follows:

| | Gms. |
|---|---|
| Titanium | 100 |
| $H_2SO_4$ | 344 |
| Iron | 20 |

After cooling and saturation with HCl gas, 223 grams of $NH_4Cl$ is added to precipitate $(NH_4)_2TiCl_6$. 620 grams of the latter is dissolved in water at 60° C., cooled to 0° C., to yield 192 grams of $NH_4Cl$ precipitate, or 86% recovery.

Example III

Rubidium chlorotitanate ($Rb_2TiCl_6$) was dissolved in water maintained at 60° C. Upon reaching a concentration of 0.8 mole per liter rubidium chloride started to precipitate. The solution became saturated with such chlorotitanate when a concentration of 1.04 moles per liter was attained. At this point the solution was rapidly cooled to 0° C. and the precipitated solid rubidium chloride filtered therefrom. The yield of RbCl was 68.7 g., representing a 27.5% recovery.

In the use of ammonium chlorotitanate, it is noted that the solubility in water at 60° C. reaches a maximum of 2.1 moles per liter. In a moles per liter range of from 0.8 to 2.1, ammonium chloride readily precipitates. Up to 0.8 mole, such compound is completely soluble in water at such temperature; likewise with $NH_4Cl$, thus there is no precipitation of the latter. At concentrations above 2.1 molar the solution becomes saturated with $(NH_4)_2TiCl_6$ which then co-precipitates with the chloride.

It will be evident from the foregoing that the above presented disclosure provides a novel method of obtaining aqueous solutions essentially of titanium tetrachloride from ilmenite ores, and it also should be evident that minor modifications and variations may be effected without departing from the spirit or scope of our invention.

We claim as our invention:

1. The method of producing an aqueous solution containing primarily titanium and chloride ions with small amounts of ionized inorganic chloride comprising the steps of: dissolving a compound selected from the group consisting of the chlorotitanates of ammonium, potassium and rubidium in hot water slightly below 60° C., said chlorotitanates being present in molar amounts ranging from that quantity at which precipitation of inorganic chloride commences to that at which said water solution becomes chlorotitanate saturated with the particular chlorotitanate employed; cooling such solution to between 0° and 20° C. to precipitate a considerable value of an inorganic chloride selected from the group consisting of the chlorides of ammonium, potassium and rubidium, depending upon which respective chlorotitanate is initially dissolved, as a crystalline solid, and separating said precipitate from the supernatant titanium-bearing solution.

2. The method of producing an aqueous solution containing primarily titanium and chloride ions with small amounts of ionized potassium chloride comprising the steps of: dissolving 0.8 to 4.0 moles per liter of potassium chlorotitanate in hot water slightly below 60° C.; cooling such solution to between 0° and 20° C. to precipitate up to 93% of the chloride present in said potassium chlorotitanate as a crystalline solid and separating said precipitate from the supernatant titanium-bearing solution.

3. The method of producing an aqueous solution containing primarily titanium and chloride ions with small amounts of ionized ammonium chloride comprising the steps of: dissolving 0.8 to 2.1 moles per liter of ammonium chlorotitanate in hot water slightly below 60° C.; cooling such solution to between 0° and 20° C. to precipitate up to 86% of the chloride present in said ammonium chlorotitanate as a crystalline solid and separating said precipitate from the supernatant titanium-bearing solution.

4. The method of producing an aqueous solution containing primarily titanium and chloride ions with small amounts of ionized rubidium chloride comprising the steps of: dissolving 0.8 to 1.04 moles per liter of rubidium chlorotitanate in hot water slightly below 60° C.; cooling such solution to between 0° and 20° C. to precipitate up to 27.5% of the chloride present in said rubidium chlorotitanate as a crystalline solid and separating said precipitate from the supernatant titanium-bearing solution.

References Cited in the file of this patent

UNITED STATES PATENTS

| 2,286,881 | Von Bichowsky | June 16, 1942 |

FOREIGN PATENTS

| 645,152 | Great Britain | Oct. 25, 1950 |
| 651,729 | Great Britain | Apr. 11, 1951 |
| 652,268 | Great Britain | Apr. 18, 1951 |